UNITED STATES PATENT OFFICE.

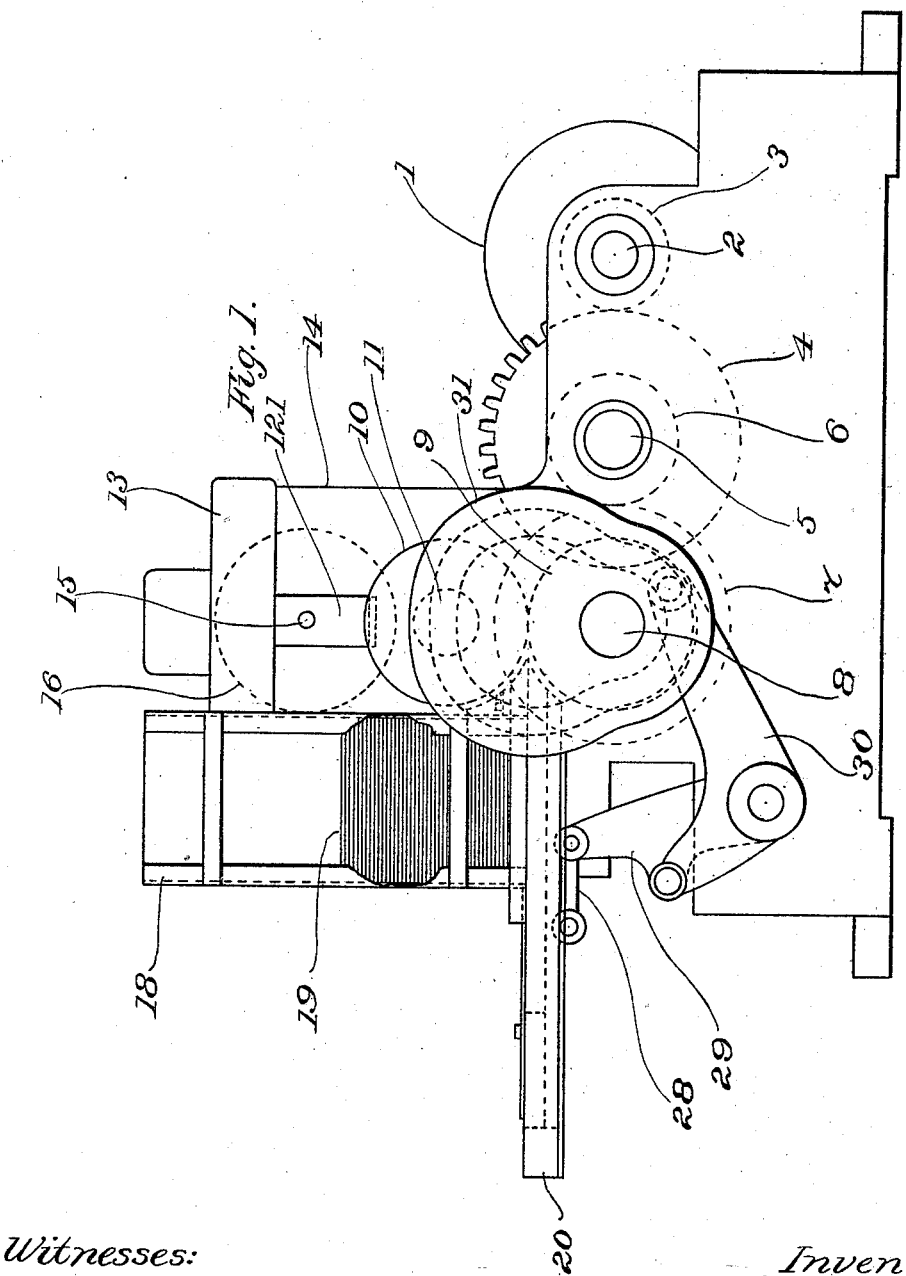

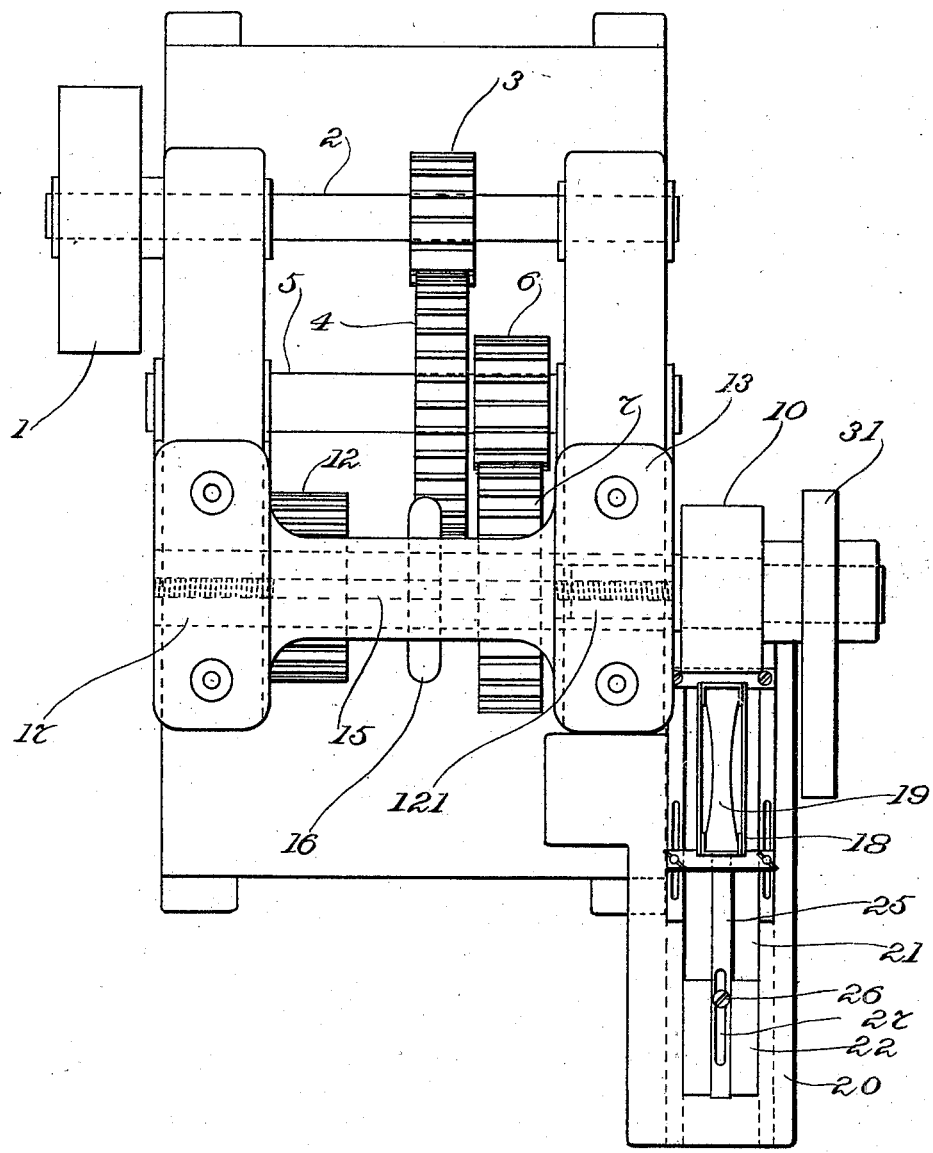

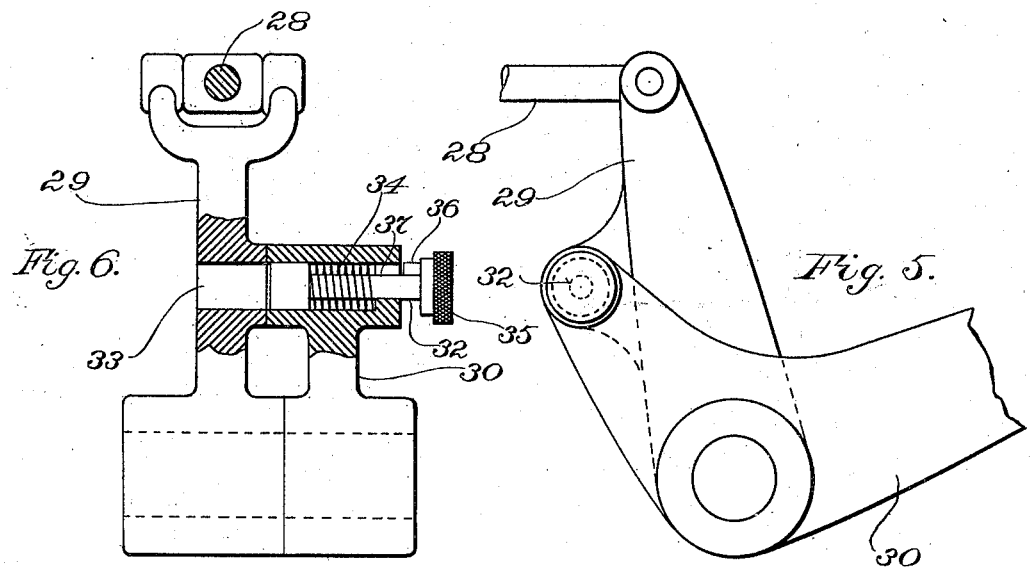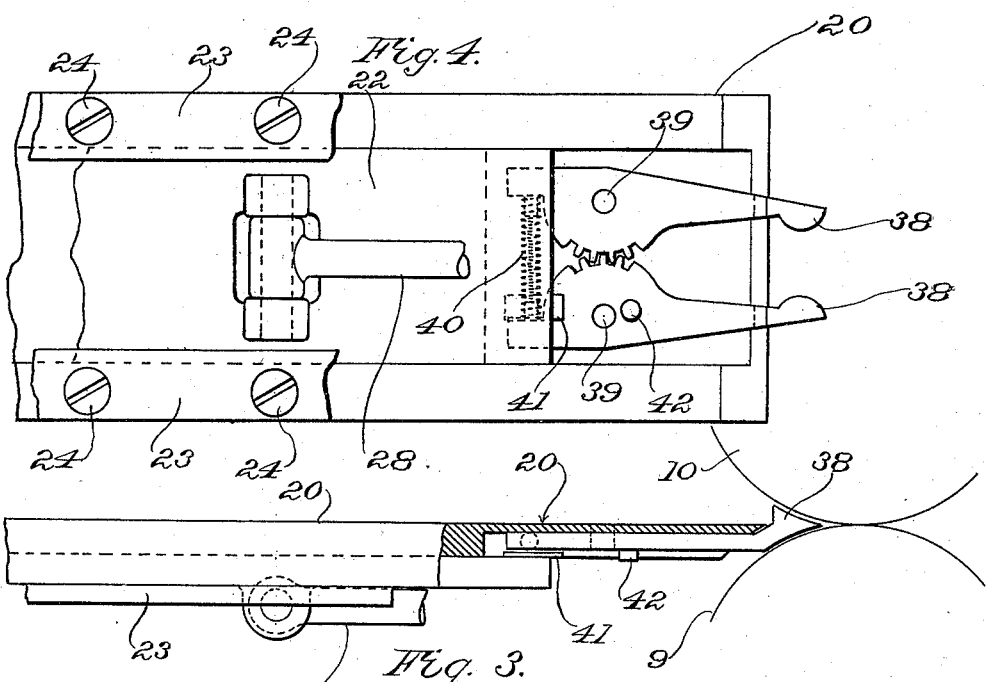

EUGENE H. TAYLOR, OF LYNN, MASSACHUSETTS.

MACHINE FOR MOLDING SHANK-STIFFENERS.

SPECIFICATION forming part of Letters Patent No. 635,065, dated October 17, 1899.

Application filed December 29, 1896. Serial No. 617,332. (No model.)

*To all whom it may concern:*

Be it known that I, EUGENE H. TAYLOR, a citizen of the United States, residing at Lynn, in the county of Essex and State of Massachusetts, have invented certain new and useful Improvements in Machines for Molding Shank-Stiffeners and the Like, of which the following is a specification, reference being had therein to the accompanying drawings.

My improvements in machines for molding or shaping shank-stiffeners and the like articles will be described first with reference to the accompanying drawings, in which latter is represented the best embodiment thereof which I have yet contrived, and afterward the distinguishing characteristics of the invention will be more particularly pointed out and distinctly defined in the claims at the close of this specification.

Figure 1 of the drawings represents in side elevation a machine containing the embodiment aforesaid of my present invention. Fig. 2 is a view showing the said machine in plan. Fig. 3 is a partly-sectional detail view, in side elevation, showing the relations of the feed-slide and automatic guides respecting the rolls. Fig. 4 is a view from the under side of the parts which are shown in Fig. 3, omitting the rolls, however. Fig. 5 is a detail view, on an enlarged scale, showing certain parts that are concerned in transmitting movement to the feed-slide. Fig. 6 is a view from the left-hand side in Fig. 5.

1, Figs. 1 and 2, is a band-pulley to receive an actuating band or belt. 2 is a shaft on which the said pulley is mounted, the said pulley and shaft being arranged to be rotated in unison.

3 is a pinion on shaft 2, arranged to rotate therewith. Pinion 3 engages and drives gear 4, which latter is fast upon shaft 5, the latter also having fast thereon the pinion 6, which meshes with and drives the gear 7, that is fast on the shaft 8 of the lower molding-roll 9. 10 is the upper molding-roll, the said rolls 9 and 10 having the peripheries thereof shaped in proper manner to give the desired shape to the shank-stiffeners or other articles that are to be molded. Roll 10 is fast on a shaft 11, which latter is driven in unison with the shaft 8 of the lower roll 9 by means of equal gears 12, of which one is shown in Fig. 2, the other corresponding therewith.

For the purpose of adjusting or varying the degree or extent to which the blanks are compressed while passing between the rolls 9 and 10 without the necessity of stopping the machine I employ a wedge 121 in connection with one or each of the bearing-blocks for the shaft 11, this wedge being interposed between the bearing for the said shaft and the cap 13 of the stand 14, to which the said bearing is applied. The wedge may be applied to each bearing for the shaft 11; but in the drawings I have shown such a wedge applied to only the bearing which is next adjacent to the roll 10. In connection with the said wedge I employ a rod or shaft 15, having mounted thereon a hand-wheel 16. The two ends of this rod or shaft 15 are screw-threaded in opposite directions, one end thereof having a right-hand thread cut thereon and the other end having a left-hand thread. If wedges are employed at both ends of the shaft 11, then each threaded portion of rod or shaft 15 will enter and fit a correspondingly-threaded hole in one of such wedges, and when the rod or shaft 15 is rotated by hand by power applied to the hand-wheel 16 the wedges will be drawn toward each other or forced apart, thereby varying the distance which the upper roll 10 will be permitted to rise from the lower roll 9. I find it sufficient in practice, however, to use a single wedge 121, as shown, in connection with the bearing that is next adjacent to roll 10 and to cause the threaded portion at the opposite end of the rod or shaft 15 to engage with a non-adjustable block 17, which may be the bearing-block for the corresponding end of the shaft 11.

18 is the hopper, in which are placed the blanks 19 that are to be subjected to the action of the rolls, and 20 is the support for the said hopper. The outer portion of this support is slotted vertically, as at 21, throughout a considerable portion of its length, and in the slot 21 works the raised portion of a feed-slide 22, the body of which is mounted between ways at the under side of the support 20 and held in place by the gibs 23 23, which are secured to the support by screws 24 24. To the upper surface of the said raised portion of the feed-slide is secured a strip 25, the forward end of which engages with the outer end of the lowest blank in hopper 18 in the movement of the feed-slide toward the rolls, and said end of the said strip impels the said blank forward into position to become engaged by the rolls. The end of the strip 25 extends beyond the slot 21 and over the upper surface of support 20, on which the blanks contained in the hopper rest. This strip is held to the feed-slide by a clamping-screw 26, the latter passing through a slot 27 in the strip, the said slot allowing the strip to be adjusted lengthwise on the feed-slide as may be required in order to adapt it to blanks of various lengths. To the under side of the feed-slide is joined pivotally an end of a connecting-rod 28, the other end of which is joined pivotally to the swinging arm 29. With the said arm 29 is combined the actuating lever or arm 30, the latter carrying a pin or roller, which plays in the groove of an actuating-cam 31, that is fast upon the shaft 8. To the end that the movements of the feed-slide may be interrupted whenever desired without stopping the rolls 9 and 10 I provide means whereby the arm 29 may be locked to the actuating lever or arm 30 or unlocked therefrom at the will of the operator. Thus in the drawings I have shown lever or arm 30 provided with a spring-actuated locking pin or bolt 32, the end of which when projected is adapted to enter a hole 33 in the arm 29. At 34 is the spring which acts upon the pin or bolt 32 to project the same, and at 35 is a milled head on the latter, by means of which it may be grasped and manipulated as desired by the operator. Whenever it is desired that the parts shall remain disconnected for a short time, the pin or bolt 32 after being retracted will be rotated partially, so as to carry a projection 36 on the retracted pin or bolt around to one side or the other of the notch 37, that is provided for its reception in lever or arm 30, the said projection being brought again into line with the said notch when it is wished to reëngage the lever or arm 30 with the arm 29.

For the purpose of guiding each blank in turn without lateral deviation into the molding-cavities I provide edge-guides 38 38, which are located closely adjacent to the bite of the rolls 9 and 10 and in position to bear against the opposite side edges of the blanks as they successively are fed forward to the rolls. I shape the top and bottom portions of these guides so as to enable them to fit in between the rolls right up to the nip or bite of the latter. The acting portions of these guides rise above the upper surface of the support 20, although the arms on which the said guides are provided extend beneath the said support, being pivoted thereto at 39 39. The said arms have connecting gearing, whereby they are caused to move simultaneously in opposite directions. Thus in the drawings they have teeth or projections which intermesh, as shown in Fig. 4. They are acted upon by a spring 40, which is interposed between the tail portions of the said arms, the said spring operating with a tendency to press the acting portions of the guides 38 38 toward each other, so as that the said guides bear with a yielding force against the side edges of a blank that is placed between them. The said guides 38 38 bear with equal or balanced force against the two side edges of a blank, and thereby insure that the said blank shall move forward in the correct line, and in consequence of being spring-pressed and geared together they follow the outline of the said edges, acting at all times while the blank is between them to exert uniform or balanced pressure against the same in opposite directions. For the purpose of opening the said guides or spreading them apart sufficient to admit between them the advancing end of a blank that is being pushed forward by the feed-slide 22 I cause the forward end of the feed-slide or a projection 41 applied thereto to engage with the projection 42, that is applied to one of the arms of the said guides 38 38.

I claim as my invention—

1. The combination, with the molding devices of a machine for molding shank-stiffeners and the like articles, and a feed-slide, of the arm 29 connected therewith, the lever or arm 30, means to actuate the said lever or arm, and a locking device to connect the arm 29 and lever or arm 30 together when required, whereby by disengaging said locking device the feed-slide may be left at rest, substantially as described.

2. The combination, with the molding devices of a machine for molding shank-stiffeners and the like articles, and a feed-slide, of the arm 29 connected therewith, the lever or arm 30, means to actuate the said lever or arm, and the spring-actuated bolt to connect the arm 29 and lever or arm 30 together, the said bolt having means to hold it retracted when desired, substantially as described.

3. The combination, with the rolls of a machine for molding shank-stiffeners and the like articles, and a feeding device, of movable edge-guides to engage with the opposite sides of an advancing blank, and means to cause said guides to bear with equal or balanced pressure against the said sides and follow the outlines thereof, substantially as described.

4. The combination with the rolls of a machine for molding shank-stiffeners and the like articles, and a feeding device of movable edge-guides 38, 38, to act against the opposite sides of an advancing blank, said edge-guides having connecting gearing whereby to cause them to move simultaneously in opposite directions, and means to cause said guides to bear with yielding force against the said sides of the blank and follow the outlines thereof, substantially as described.

5. The combination with the rolls of a machine for molding shank-stiffeners and the like articles, and a feeding device of movable edge-guides 38, 38, to act against the opposite sides of an advancing blank, said edge-guides having connecting gearing whereby to cause them to move simultaneously in opposite directions, means to cause said guides to bear with yielding force against the said edges of the blank and follow the outlines thereof, and means whereby in the advancing movement of the blank the said guides are spread apart to admit the leading end of the said blank, substantially as set forth.

In testimony whereof I affix my signature in presence of two witnesses.

EUGENE H. TAYLOR.

Witnesses:
　CHAS. F. RANDALL,
　EDITH J. ANDERSON.